(12) United States Patent
Deckers et al.

(10) Patent No.: US 7,514,059 B2
(45) Date of Patent: Apr. 7, 2009

(54) METHOD FOR THE PRODUCTION OF HYDROCYANIC ACID

(75) Inventors: Andreas Deckers, Flomborn (DE); Arnulf Lauterbach, Ludwigshafen (DE); Anton Negele, Deidesheim (DE); Thomas Schneider, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 23 days.

(21) Appl. No.: 11/574,064

(22) PCT Filed: Sep. 2, 2005

(86) PCT No.: PCT/EP2005/009476

§ 371 (c)(1),
(2), (4) Date: Feb. 22, 2007

(87) PCT Pub. No.: WO2006/027176

PCT Pub. Date: Mar. 16, 2006

(65) Prior Publication Data

US 2007/0231239 A1 Oct. 4, 2007

(30) Foreign Application Priority Data

Sep. 6, 2004 (DE) ........................ 10 2004 042 986

(51) Int. Cl.
*C01C 3/02* (2006.01)

(52) U.S. Cl. ..................................................... 423/373
(58) Field of Classification Search ................. 423/372, 423/373
See application file for complete search history.

(56) References Cited

U.S. PATENT DOCUMENTS 6,441,234 B1 * 8/2002 Dahlhaus et al. ............ 564/132

FOREIGN PATENT DOCUMENTS

| DE | 927 623 | 5/1955 |
| DE | 1 592 347 | 3/1970 |
| DE | 29 47 828 | 7/1981 |
| DE | 101 38 553 | 5/2003 |
| EP | 0 209 039 | 1/1987 |

* cited by examiner

*Primary Examiner*—Wayne Langel
*Assistant Examiner*—Brittany M Martinez
(74) *Attorney, Agent, or Firm*—Oblon, Spivak, McClelland, Maier & Neustadt, P.C.

(57) ABSTRACT

Process for preparing hydrocyanic acid by catalytic dehydration of gaseous formamide, in which a formamide-containing recycle stream is obtained from the product mixture after the dehydration and is recirculated to the dehydration, wherein the formamide-containing recycle stream contains from 5 to 50% by weight of water.

4 Claims, No Drawings

METHOD FOR THE PRODUCTION OF HYDROCYANIC ACID

CROSS REFERENCE TO RELATED APPLICATIONS

This application is the U.S. national stage of International Application No. PCT/EP05/09476, filed Sep. 2, 2005, the disclosure of which is incorporated herein by reference in its entirety. This application claims priority to German Patent Application No. 10 2004 042 986.3, filed Sep. 6, 2004, the disclosure of which is incorporated herein by reference in its entirety.

BACKGROUND

The invention relates to a process for preparing hydrocyanic acid (HCN) by catalytic dehydration of gaseous formamide in the presence of oxygen.

Hydrocyanic acid is an important basic chemical which is used as starting material in numerous organic syntheses such as the preparation of methacrylic esters, lactic acid and metal cyanides, as polyamide precursor, for preparing pharmaceutical and agrochemical products, in mining and in the metallurgical industry.

An important process for the industrial preparation of hydrocyanic acid is thermal dehydration of formamide under reduced pressure, which proceeds according to the equation (I):

$$HCONH_2 \rightarrow HCN + H_2O \quad (I)$$

This reaction is accompanied by the decomposition of formamide according to equation (II) to form ammonia and carbon monoxide:

$$HCONH_2 \rightarrow NH_3 + CO \quad (II)$$

The ammonia formed catalyzes the polymerization of the desired hydrocyanic acid and thus leads to a deterioration in the quality of the hydrocyanic acid and a reduction in the yield of the desired hydrocyanic acid.

Soot is formed in the preparation of hydrocyanic acid and its formation can, as disclosed in EP-A 0 209 039, be suppressed by the addition of small amounts of oxygen in the form of air. In the disclosure of EP-A 0 209 039, a process for the thermolytic dissociation of formamide over densely sintered shaped aluminum oxide or aluminum oxide-silicon dioxide bodies or over shaped chromium-nickel stainless steel bodies which are corrosion-resistant at high temperature is described. Since the conversion of formamide in this process is incomplete, DE-A 101 38 553 suggests recirculating unreacted residual formamide to the formamide dissociation.

SUMMARY

It is an object of the invention to provide a process for preparing hydrocyanic acid by catalytic dehydration of formamide, which is simple to carry out and gives a high formamide conversion and a high yield of hydrocyanic acid.

This object is achieved by a process for preparing hydrocyanic acid by catalytic dehydration of gaseous formamide, in which a formamide-containing recycle stream is separated off from the product mixture after the dehydration and is recirculated to the dehydration, wherein the formamide-containing recycle stream contains from 5 to 50% by weight of water.

The dehydration of formamide is preferably carried out in the presence of oxygen.

It has been found that unreacted formamide can be recirculated to the formamide dehydration as a water-containing mixture after high boilers have been separated off without the water content of the recirculated formamide having an adverse effect on the selectivity of hydrocyanic acid formation. Complicated removal of pure formamide by means of rectification can thus be dispensed with. A significantly simpler process is realized as a result.

DETAILED DESCRIPTION OF EXEMPLARY EMBODIMENTS

In the process of the invention, gaseous formamide is dehydrated in the presence of generally from 0 to 10 mol % of atmospheric oxygen, based on the amount of formamide used, preferably from 0.1 to 10 mol %, particularly preferably from 0.5 to 3 mol %, of atmospheric oxygen at temperatures of generally from 400 to 600° C., preferably from 450 to 550° C., particularly preferably from 500 to 550° C.

The process of the invention is generally carried out under reduced pressure, preferably at a pressure of from 70 to 350 mbar, particularly preferably from 80 to 200 mbar. The dehydration is usually carried out in a multitube reactor. The mean residence time over the catalyst is generally from 0.01 to 0.5 s, preferably from 0.05 to 0.2 s.

In general, gaseous formamide is used in the process of the invention. The formamide is preferably obtained by vaporizing liquid formamide in a heat exchanger preferably a shell-and-tube heat exchanger, falling film evaporator or thin film evaporator, under a reduced pressure of generally from 1 to 350 mbar, preferably from 80 to 250 mbar and at temperatures of generally from 100 to 300° C., preferably from 130 to 200° C. The formamide vapor is subsequently brought to the reaction temperature in the dehydration reactor or in an upstream heat exchanger.

Suitable catalysts are, for example, densely sintered shaped bodies comprising from 50 to 100% by weight, preferably from 85 to 95% by weight, of aluminum oxide and from 0 to 50% by weight, preferably from 5 to 15% by weight, of silicon dioxide, shaped chromium-nickel stainless steel bodies as described in EP-A 0 209 039, steel packing or iron oxide on a porous support, as described in DE-A 101 38 553.

A product mixture comprising hydrocyanic acid and water and also unreacted formamide, ammonia, CO and high boilers such as polymers and salts is obtained. A mixture of water, formamide and high boilers and also small amounts of ammonia and HCN is usually condensed out as condensate 1 from the product gas mixture formed in the dehydration. For this purpose, the product gas mixture which usually leaves the dehydration reactor at a temperature of from 400 to 600° C. is cooled in a heat exchanger to a temperature of from 10 to 80° C. A gas stream consisting essentially of hydrocyanic acid, water, ammonia and CO remains. Hydrocyanic acid is isolated from this gas stream. For this purpose, ammonia is preferably removed by extraction, for example by absorption in sulfuric acid, and hydrocyanic acid is subsequently obtained as condensate 2.

The recirculated water-containing formamide is obtained from the condensate 1. The recirculated formamide is preferably not obtained directly from the condensate 1, but instead part of the water and gases dissolved therein is separated off from the condensate 1, for example in a stripping column, giving a condensate 3 comprising water, high boilers and formamide, and the formamide-containing recycle stream is separated off from the condensate 3 by simple distillation.

In this preferred process variant, dissolved gases and water are separated off from the condensate 1 at generally from 50 to 120° C., preferably from 60 to 120° C., and at from 70 to 400 mbar, preferably from 80 to 200 mbar, in a stripping column. This leaves a bottom product which generally comprises from 50 to 85% by weight of formamide, from 10 to 40% by weight of water, from 5 to 10% by weight of high boilers and from 0 to 2% by weight of dissolved gases as condensate 3.

The formamide-containing recycle stream is preferably separated off from the condensate 3 by simple distillation. The formamide-containing recycle stream contains from 5 to 50% by weight, preferably from 15 to 30% by weight, of water. In addition, it can further comprise small amounts of ammonia and HCN, generally in amounts of from 0 to 1% by weight. The simple distillation to separate off the formamide-containing recycle stream is generally carried out at a pressure of from 20 to 150 mbar, preferably from 50 to 100 mbar, for example 75 mbar, and a temperature of from 110 to 160° C., preferably from 130 to 160° C., for example 145° C. The simple distillation is preferably carried out in an evaporator, for example a shell-and-tube heat exchanger with natural or forced circulation.

A formamide conversion of from 80 to 98%, based on the total formamide fed to the dehydration (fresh feed+recirculated formamide) is generally achieved by means of the process of the invention. The selectivity of hydrocyanic acid formation is generally from 85 to 96%.

The invention is illustrated by the following examples.

EXAMPLES

Example 1

10 $l/(h \times m^2)$ of formamide vapor (fresh formamide and recirculated formamide) and 0.3 kg/h of air are fed into the single-tube reactor described in example 1 of EP-A 0 209 039 containing a bed of shaped catalyst bodies comprising 93% by weight of $Al_2O_3$ and 7% by weight of $SiO_2$ in the form of Raschig rings having dimensions of 15×15×2 mm and dehydrated at a pressure of 140 mbar and a temperature of 420° C. A formamide conversion of 90.5% is achieved. 2.1 $l/(h \times m^2)$ of a mixture of 45% by weight of formamide, 50% by weight of water, 2% by weight of high boilers and 3% by weight of ammonia and HCN are condensed out from the product gas mixture. A low-boiling mixture of water and gases dissolved therein is firstly separated off from this condensed mixture by means of a simple distillation at 90-120 mbar and 60-85° C. This leaves a mixture comprising formamide, high boilers and about 30% by weight of water (condensate 3). This formamide-containing mixture is separated into water, formamide and high boilers in a subsequent rectification in a packed column having 6 theoretical plates at a pressure of 100 mbar, with essentially pure formamide having a formamide content of >98% by weight being obtained as a side offtake. The pure formamide (0.77 $l/(h \times m^2)$), corresponding to 81% of the amount of formamide condensed out) is recirculated to the reactor. The recirculation does not alter the formamide conversion, based on the total formamide fed in (fresh formamide and recirculated formamide), and the selectivity of the reaction.

Example 2

The procedure of example 1 is repeated, but the rectification is replaced by simple distillation of formamide and water from the condensate. A mixture of about 70% by weight of formamide, about 30% by weight of water and <1% by weight of ammonia is recirculated to the dehydration reactor. A higher conversion of 92.7% (compared to only 90.5% in example 1), based on the total formamide fed in (fresh formamide and recirculated formamide), is achieved, with the selectivity of the reaction remaining unaltered. As a result of the simplified formamide recovery, a larger amount of formamide, based on formamide condensed out, is recirculated (0.66 $l/(h \times m^2)$, corresponding to 90% of the amount of formamide condensed out).

The invention claimed is:

1. A process for preparing hydrocyanic acid, comprising:
   performing catalytic dehydration of gaseous formamide to obtain a product mixture; and
   recirculating a formamide-containing recycle stream obtained from the product mixture to the dehydration; wherein:
   the formamide-containing recycle stream comprises from 15 to 50% by weight of water; and
   the formamide-containing recycle stream is obtained by:
      condensing out a mixture of water, formamide, high boilers and dissolved gases from the product mixture after the dehydration as a first condensate;
      separating off a part of the water and the dissolved gases from the first condensate to obtain a second condensate comprising water, formamide and high boilers; and
      separating off the formamide-containing recycle stream from the second condensate by simple distillation.

2. The process according to claim 1, wherein the catalytic dehydration is carried out in the presence of oxygen.

3. The process according to claim 1, wherein the simple distillation is carried out at a pressure of from 20 to 150 mbar and a temperature of from 110 to 160° C.

4. The process according to claim 1, wherein the catalytic dehydration is carried out at a temperature of from 400 to 600° C. and a pressure of from 70 to 350 mbar.

* * * * *